May 13, 1952 — H. D. AHLSTROM ET AL — 2,596,111
GENERAL UTILITY CLAMP
Filed Sept. 7, 1948

Harvey D. Ahlstrom
Ermald N. Foltz
INVENTORS

BY *Clarence A. O'Brien*
*and Harvey B. Jackson*
Attorneys

Patented May 13, 1952

2,596,111

UNITED STATES PATENT OFFICE 2,596,111

GENERAL UTILITY CLAMP

Harvey D. Ahlstrom and Ermald N. Foltz, Oneida, Wis.

Application September 7, 1948, Serial No. 48,144

2 Claims. (Cl. 223—88)

The present invention relates to a novel and improved multiple purpose accessory which, we believe, may be conveniently and aptly referred to as a general utility clamp, the same being such that it may be applied, adjusted and securely clamped on a complemental member or part and serving, when in place, as a connecting and anchoring device, for example the anchorage of one end of a clothes line or the like to a relatively fixed support.

Another object of the invention is to provide a multiple purpose utility clamp which, when properly sized, may be used in many different lines of endeavor; for instance, may be employed in conjunction with a wire garment hanger in place of clasps and clips for attaching suspended trousers, women's skirts and the like, on and from said hanger.

Another object of the invention is to provide a simple, practical and economical utility clamping device of the style and form shown and hereinafter described which is readily adaptable for practical use in securely connecting the end of a tent rope with a ground anchored stake in a manner to assure reliable attachment of the rope to the stake and to facilitate taking up, if necessary, slack in the stated rope.

The device is not restricted to the fields of endeavor referred to but is also susceptible of use in other lines of endeavor involving the handling and anchorage of telephone lines, radio and television antennas and wherever a flexible line is to be tautly connected with a relatively stationary pole or similar support.

Briefly, the preferred embodiment of the invention comprises, primarily considered, three units; an especially bent wire or equivalent adapter and force applying unit, a friction retained gripping unit directly cooperable with the first unit and a rod, pin, pole or other supporting member which is embraced by the first unit and against which the gripping unit is pressed and held to obtain the desired clamping results.

Other objects and advantages will become more readily apparent from the following description and the accompanying illustrative drawings.

Figure 2:
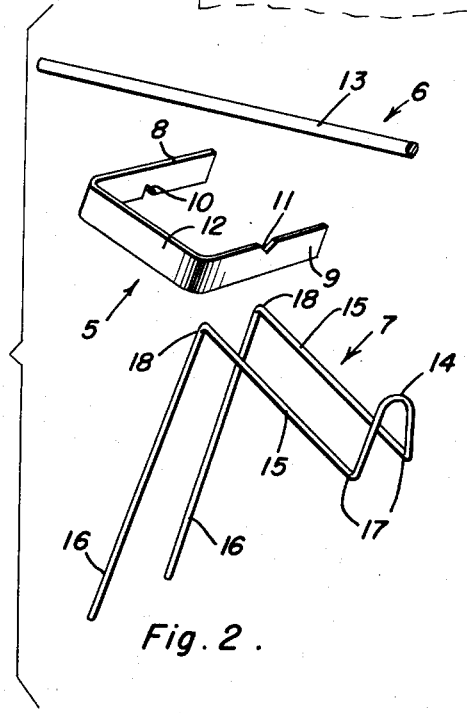
Figure 2 is a group perspective view of the invention per se, the same characterized by the aforementioned two units and third unit or member with which they have coactive clamping association.

Referring now to the drawings and especially the Figure 2 it will be seen that the assemblage, the general utility clamp so-called, is made up of three complemental units; namely, the gripping unit 5, the part or unit 6 which is partly embraced and gripped by said unit 5, and the applicator and adapter unit 7 which serves to harness the unit 5 on the unit 6 to attain the desired coactive relationship.

Referring now to the drawings by distinguishing numerals, the unit 5, which generally takes the form of a frame, is here shown as U-shaped in form and made of rigid strap or equivalent metal and includes a pair of spaced parallel arms 8 and 9, the arm 8 having a keeper seat or notch 10 in its lower edge and the arm 9 having a corresponding keeper notch or seat 11 in its upper edge. The central portion is a connective bight, as at 12. The part or unit 6 which is to be frictionally gripped. The unit 6 is rectilinearly straight pin, post or equivalent element 13 and the notched arms cross same at approximate right angles to its longitudinal axis of application in Figures 1 and 3. The frame could be V-shaped, rounded and C-shaped or any equivalent form and still provide the opposed arms for right angular association with the supporting member or unit 6.

The applicator and adapter unit 7 may be of suitable form but is preferably of stout substantially rigid wire which is bent upon itself and between its ends to provide the details and arrangement shown in Figure 2. The laterally bent intermediate portion 14 provides a harnessing saddle and extending obliquely from this are opposed parallel limb portions 15 connected in approximate right angular relationship with the terminal limb portions 16. The limb portions 15 are adapter arms and provide definite accommodation bends 17—17 at one end and 18—18 at the opposite ends. These bends may be perhaps conveniently referred to as stirrups for the arms 8 and 9 in that they embrace and seat the arms and apply the stresses and forces in the desired directions. The limb portions 16 are in effect levers and these transmit the movements and forces necessary to bring about the desired coaction between the member 13, saddle 14, adapter arms 15 and gripping unit 5, this in relation to the stated bends or stirrups 17 and 18 respectively.

Figure 3:
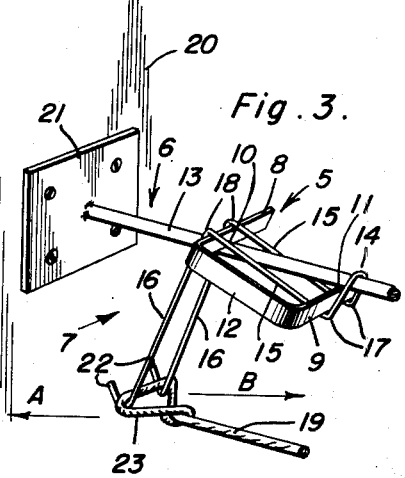
Figure 3 is a fragmentary perspective view showing the manner in which our novel utility clamp may be used for connecting and anchoring a clothes line or the like on a fixed support.

The principle of use of the invention may be best described it is believed by referring first to Figure 3 wherein we will assume that a clothes line or the like 19 is to be anchored or attached to a supporting post or the like 20. In these circumstances the supporting element or unit 13 is integral with an attaching plate 21 connected to the post 20. The free ends of the limbs 16 are fashioned into retaining hooks 22 for the looped end of the clothes line 19. Before the clothes line is tied or otherwise connected to the lever-like limbs 16, the device 7 is first placed over the member 13 which here takes the form of a rigid metal or equivalent horizontally disposed rod. The unit 7 is harnessed over the rod and then said unit 7 is bodily rocked or tilted to permit the arm portions 8 and 9 to be slipped in place between the adapter arms 15 and the accommodation bends 17 and 18. This is accomplished so that the arms 8 and 9 are arranged with the arm 9 below and crossing the rod 13 and the arm 8 above and also crossing the rod with the rod fitted into the keeper notches 10 and 11. Obviously, if the lever means 16 be moved in the direction of the arrow A, the clamping grip is released and the clamp then made up of the two parts 5 and 7 may be slipped longitudinally along the supporting rod 13 to the wanted point of anchorage. When the lever means 16 is moved in the direction of the arrow B, then the forces applied are such that the arms 8 and 9 are frictionally bound against diametrically opposed top and bottom surfaces of the rod 13 and the desired clamping result is attained. It is necessary to pull the clothes line in the direction of the arrow B in order to apply these forces, as is obvious.

Figure 1:
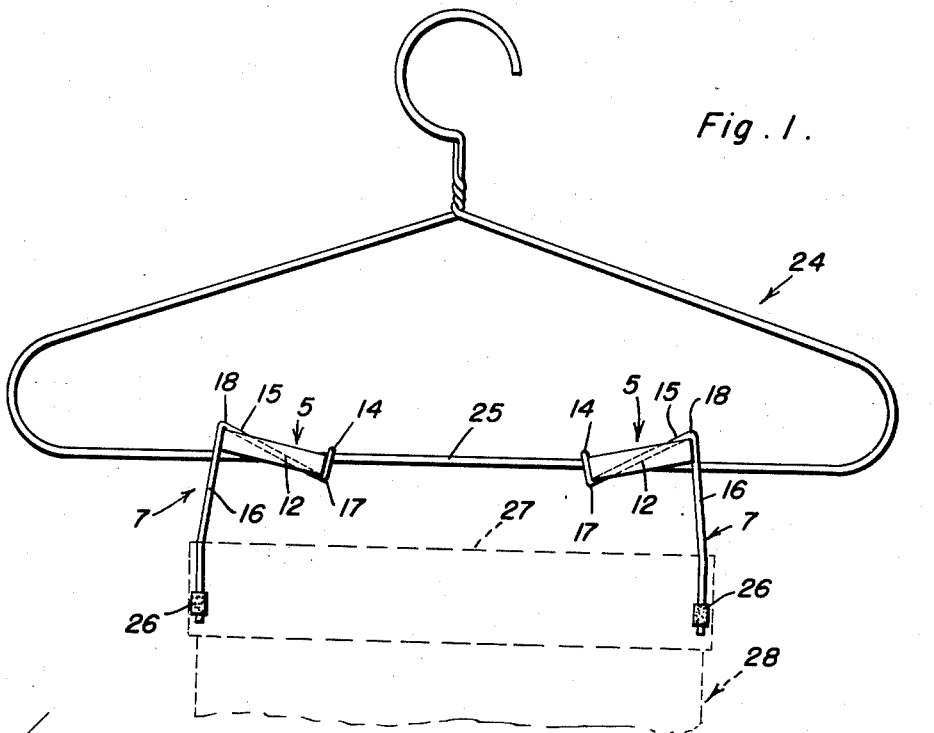
Figure 1 is an elevational view showing the manner in which a pair of general utility clamping devices, constructed in accordance with our ideas are used in association with a garment hanger.

By assuming the rod 13 to be a tent stake or the like driven in the ground and the clothes line as a tent rope, it will be seen how the invention may then be used as a clamping connector between a rope and a stake and the same principle would apply to the connection and anchorage of telephone wires, electric wires and the like on relatively fixed poles and the like, through the medium of the stated clamping device. When made of proper size and material the device, used in pairs, may be employed in connection with a wire type garment hanger as shown in Figure 1, the garment hanger denoted by the numeral 24. Here the horizontal bar or rod 25 of the coat hanger corresponds to the support 13 shown in Figure 3. So the device is applied on the rod 25 the same as it would be on the post supported rod 13 in Figure 3. Since the clamping device shown in Figure 3 is the same as the clamping devices shown in Figure 1, the same reference numerals are employed. The only difference is that the hooks 22 are omitted in Figure 1 and rubber sleeves or similar protective guards 26 are utilized in the manner shown. Here the limb portions 16 are individually fitted into the opposite ends of the cuff 27 of a trousers leg 28. Thus the clamping devices may be used as clips for attaching trousers or the like to a garment hanger. The tension applied to the members 16 by the weight of the trousers serves to transfer the necessary forces by way of the unit 7 to apply the gripping units 5 on the cross rod 25. As stated, the unit 6 is satisfactorily identifiable as a relatively rigid and fixed support, the same being properly embraced by the opposed arm portions of the gripper unit 5 and the gripper unit being harnessed on the support by the applicator and adapter unit 7.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a structural assemblage of the class described, in combination, a wire adapter and applicator unit having a U-shaped saddle at one end adapted to be hung on a relatively stationary rod member, a pair of arms extending in spaced parallelism in respect to each other and at right angles from said saddle, and a pair of lever-forming limbs connected to end portions of said arms and extending at right angles from said arms, and a gripper unit, said unit being a substantially U-shaped rigid metal frame embodying spaced parallel arms, one arm being disposed at right angles to the first-named arms and resting against said saddle, the bight portion of the frame being substantially parallel to one of the first-named arms, and the remaining arm on the U-shaped frame being at right angles to and engageable with the first-named arms.

2. For use on and in association with a relatively fixed support rod, a readily applicable, removable and adjustable clamp comprising an elongated element bent between its ends to provide an attaching and fulcruming saddle, a pair of opposed spaced parallel arms attached at coresponding ends to and extending at right angles from said saddle and a pair of complemental limbs attached to the opposite corresponding ends of said arms and disposed at right angles to said arms, said limbs having free end portions terminating in hooks, and a gripper unit embodying a pair of structurally connected inflexible spaced parallel members, one member resting atop and extending at right angles across said arms and resting against said saddle, and the remaining member underlying said arms and extending at right angles to the arms and likewise at right angles to and contacting said limbs at their point of junctural connection with said arms.

HARVEY D. AHLSTROM.
ERMALD N. FOLTZ.

REFERENCES CITED

The following references are of record in the file of this patent:

UNITED STATES PATENTS

| Number | Name | Date |
| --- | --- | --- |
| 2,135,255 | Johnson | Nov. 1, 1938 |
| 2,190,102 | Herzinger | Feb. 13, 1940 |
| 2,462,719 | Byrd | Feb. 22, 1949 |